June 22, 1926.
A. C. BRADSHAW
1,589,786
FLOAT VALVE FOR FLUSH TANKS
Filed Oct. 11, 1924
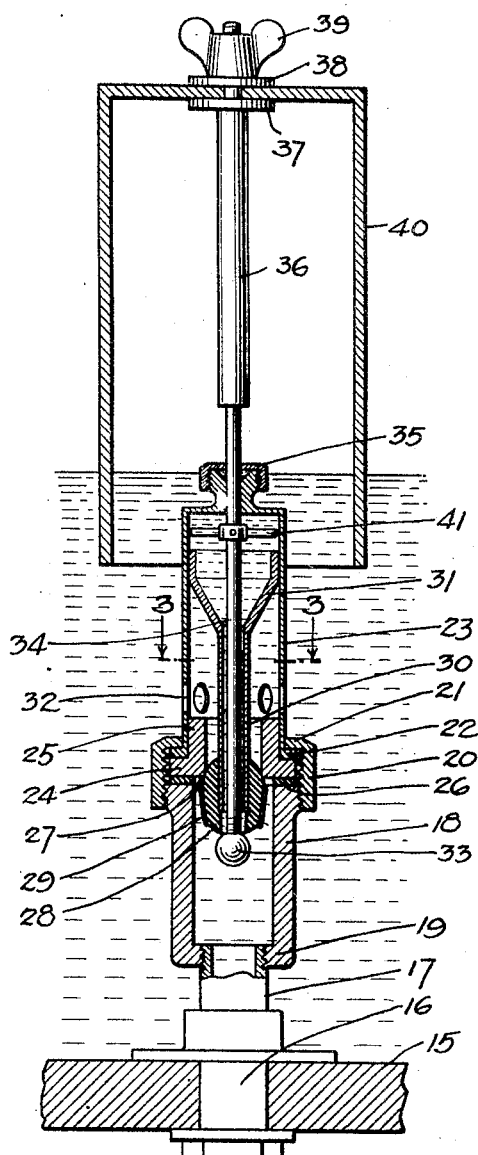
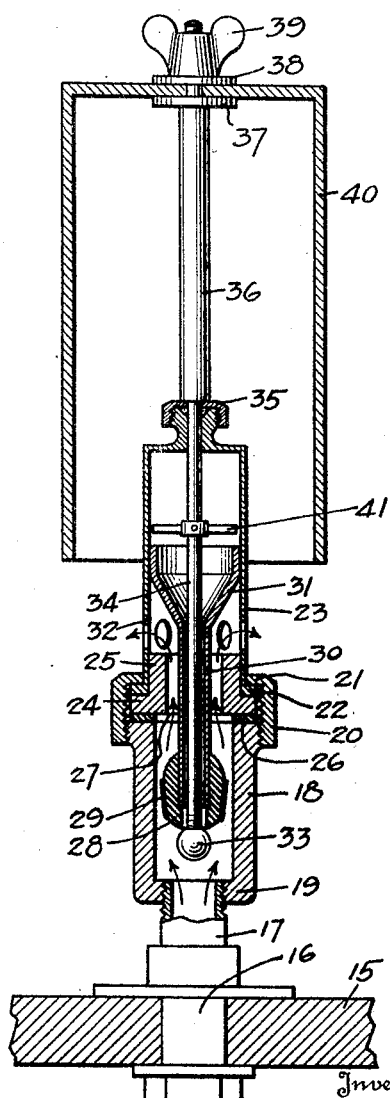
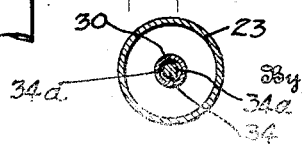
Inventor
ANDREW C. BRADSHAW
By Munn & Co.
Attorneys Patented June 22, 1926.

1,589,786

UNITED STATES PATENT OFFICE.

ANDREW C. BRADSHAW, OF LOS ANGELES, CALIFORNIA.

FLOAT VALVE FOR FLUSH TANKS.

Application filed October 11, 1924. Serial No. 743,095.

My invention relates to float valves for flush tanks, which operate automatically to control the filling of the tank subsequent to its emptying.

A purpose of my invention is the provision of a float valve of extremely simple, inexpensive and durable construction which utilizes the pressure of the water supplied to the flush tank for closing and opening the valve, and the valve closing with the pressure so that the latter is utilized to maintain the valve in tightly closed position.

It is also a purpose of my invention to provide a float valve of the above described character which includes an inlet valve closing with the pressure of water entering the tank, and a float controlled valve for controlling the passage of water to a cylinder to act on the piston operatively connected to the inlet valve whereby the latter is moved to open position.

I will describe only one form of float valve for flush tanks embodying my invention and will then point out the novel features thereof in claims.

In the accompanying drawings,

Figure 1 is a view showing a vertical section of one form of float valve embodying my invention in applied position with respect to the flush tank and in closed position;

Figure 2 is a view similar to Figure 1, showing the valve in open position;

Figure 3 is a transverse sectional view taken on the line 3—3 of Figure 1.

Referring specifically to the accompanying drawings. in which similar reference characters refer to similar parts, my invention, in its present embodiment, is shown as applied to a conventional form of flush tank, the bottom of which latter is indicated at 15. Through the bottom 15 a water supply pipe 16 extends to a coupling member 17 designed to detachably support a discharge tube 18 in upright position within the tank, the lower end of the latter being provided with an in-turned flange 19 which is threaded to engage the coupling member. The tube 18 is threaded at its upper end for engagement with a coupling collar 20 provided with an annular flange 21 which engages a similar flange 22 formed on a cylinder 23 for securing the latter to a flange 24 of an annulus 25. The annulus 25 is also secured in proper position with respect to the tube 18 by means of the collar 20, a gasket 26 being interposed between the annulus and tube to provide a water tight joint, as will be understood.

The internal diameter of the annulus 25 is less than that of the tube 18, so as to provide a valve seat 27 for an inlet valve 28. The valve 28 is formed of suitable compressible material, such as rubber or the like, and is preferably provided with a protecting band 29 formed of metal or other suitable material. This inlet valve 28 is tubular, as shown, and extending into the same and secured thereto is the lower end of a tubular piston rod 30, the upper end of the latter being formed with a piston 31 of substantially conical form. The piston 31 is mounted for sliding movement within the cylinder 23, being slightly smaller than the latter and forming an annular passage therebetween and being operatively connected to the inlet valve 28 is adapted to move the latter to open position so that water from the inlet pipe 16 can pass into the tank through outlet ports 32 formed in the cylinder 23.

A control valve 33 is mounted at the lower end of a rod 34. the latter extending through the piston 31 and rod 30 so as to normally support the control valve 33 in closing relation with respect to the opening of the inlet valve 28. Water is adapted to pass through the piston rod 30 and around the rod 34, and to facilitate such a flow the rod 34 is formed with two flat sides forming the passages 34ª, as clearly shown in Figure 3. The rod 34 extends through the upward end of the cylinder 23 where a stuffing box 35 is provided to prevent undue leakage of water into or out of the cylinder. Above the cylinder, the rod 34 is surrounded by an enlarged extension 36 having a flange 37 thereon which co-operates with a washer 38 and a wing nut 39 for securing a float 40 in upright position on the rod. This float consists of an inverted cup-shaped member in which air is adapted to be trapped by the water so as to give the float the necessary buoyancy to operate the valves 28 and 33.

In operation, the inlet valve 28 is normally held against the seat 27 by means of the float 40 acting to elevate the control valve 33, thus urging the valve 28 upwardly. The pressure of the water within the inlet pipe 16 is also free to act on the valve 28, thus aiding in maintaining the valve in tightly closed position. As the tank is emptied of water through the manipulation of the usual discharge valve, (not shown), the float 40 moves downwardly, thus imparting a similar movement to the rod 34, so that the control valve 33 opens the lower end of the piston rod 30 when water rushes upwardly through passage 34ª of the rod and into the cylinder 23 above the piston 31, building up a pressure which acts to move the piston 31 downwardly sufficiently to open the inlet valve 28. With the valve 28 open, it will be clear that water from the inlet pipe is free to pass into the tank through the ports 32, and in practice the float valve is adapted to be associated with the flush tank in such manner that the ports 32 at all times are below the level of the water even when the tank is emptied, as commonly expressed. In this manner, the tank is silently refilled, as will be understood.

With the float valve in open position, as shown in Figure 2, it will be clear that as the tank refills the float will be gradually elevated, thereby imparting a similar movement to the rod 34 to cause the valve 33 to engage the valve 28, and thus move the latter to closed position, this closing movement being aided by the pressure of water in the inlet pipe. During upward movement of the valve 28, the piston 31 of necessity also moves upwardly within the cylinder 23, and the water in the cylinder above the piston resultant of the pressure is allowed to escape around the piston so that the latter is free to move to its uppermost position.

Should the piston for any reason fail to move within the cylinder under the pressure of the water admitted to the latter, a cross arm 41 secured to the rod 34 for movement therewith will engage the piston 31 during the downward movement of the float to impart the weight of the float to the piston so as to aid the pressure of the water in moving the piston to open the valve 28. It is to be understood that the cross arm 41, however, only engages the piston 31 in the event that the water in the cylinder is ineffective to move the piston.

Although I have herein shown and described only one form of float valve for flush tanks embodying my invention, it is to be understood that various changes and modifications may be made therein without departing from the spirit of the invention and the spirit and scope of the appended claims.

I claim as my invention:

1. A float valve of the character described comprising an inlet valve adapted to close with the pressure of water entering a tank, a cylinder, a hollow piston movable in the cylinder and operatively connected to the inlet valve, and a float operated valve adapted to normally hold the inlet valve to closed position and controlling the flow of water into said cylinder in such manner that when the float is depressed water will be admitted to the cylinder to actuate the piston and open the inlet valve.

2. A float valve of the character described comprising a cylinder having outlet ports therein, an inlet pipe, a valve seat between the two, an inlet valve normally elevated on said seat to prevent the passage of water from the inlet pipe to said cylinder, a port in the inlet valve, a piston movable in the cylinder, a tubular extension on the piston fixed to the inlet valve and communicating with said port, a rod extending loosely through the extension, a control valve on the rod normally closing the port of the inlet valve, a float on the rod normally elevated and adapted when lowered to move the control valve to open said port whereby water from the inlet pipe will pass through the extension and into the cylinder, thereby moving the piston to unseat the inlet valve and a cross arm secured to the rod above the piston so as to engage the latter.

3. A float valve of the character described, comprising an inlet tube, an annulus on the tube having a valve seat, a cylinder on the annulus having outlet ports therein, a hollow piston movable in the cylinder, a hollow piston rod on the piston extending through said annulus, an inlet valve secured to said rod and having an opening communicating with the rod, a rod loosely fitted in the piston rod and slidable through the upper end of the cylinder, a float on the second rod, and a control valve on the lower end of the second rod controlling said opening.

4. A float valve as embodied in claim 3 wherein a cross arm is fixed to the second rod above the piston for the purpose described.

ANDREW C. BRADSHAW.